May 24, 1960  A. E. MARTIN  2,938,118
SELF BALANCING ELECTRICAL INSTRUMENTS
Filed Aug. 13, 1956

United States Patent Office 2,938,118
Patented May 24, 1960

2,938,118

SELF BALANCING ELECTRICAL INSTRUMENTS

Albert E. Martin, Newcastle-upon-Tyne, England, assignor to Sir Howard Grubb, Parsons & Company Limited, Newcastle-upon-Tyne, England Filed Aug. 13, 1956, Ser. No. 603,544

Claims priority, application Great Britain Aug. 12, 1955

3 Claims. (Cl. 250—43.5)

This invention relates to self balancing electrical instruments.

When it is desired to measure some physical quantity that can be expressed electrically, it is possible to measure the electrical signal directly, e.g. with a galvanometer or amplifier and output meter; or a second electrical signal can be generated under conditions such that the magnitude of the signal is known accurately from moment to moment, and this is put in opposition to the signal to be measured. The voltage is varied until exact equality is obtained, a sensitive indicator being used to detect any want of balance. When an exact balance is obtained, the unknown signal must exactly equal the opposing known signal.

This method of measurement has been applied to temperature measurement with thermo-couples for many years. The voltage from the thermo-couple is opposed by a D.C. voltage derived from a potentiometer and any out-of-balance signal is applied to a sensitive galvanometer.

In recent years, this form of instrument has been superseded by an electronic type in which the D.C. out-of-balance current is converted into A.C. by a vibrator operated from the A.C. mains and this A.C. signal is amplified to the level where it can be applied to one winding of a 2-phase-motor, the other winding being supplied directly from the mains.

Both voltages have the same frequency and it is arranged for them to be 90° out of phase so that they combine to form a rotating magnetic field and the rotor of the motor rotates at a speed dependent on the frequency of the supplies.

If the D.C. out-of-balance signal changes sign, the amplified A.C. derived from it reverses its phase and the motor reverses its direction of rotation. Thus the motor can be used to vary the potentiometer setting until the voltage from the potentiometer exactly equals that from the thermo-couple, when the out-of-balance signal drops to zero and no A.C. current is available for the second phase of the motor, which therefore comes to rest.

The potentiometer slider thus indicates the value of the thermo-couple voltage which can be continuously recorded. The advantages of this newer instrument are the avoidance of the fragile galvanometer movement previously required, greater speed of response, and the ability to record continuously instead of point by point as with the galvanometer instrument in which the pointer has to be locked in positon periodically so that the balancing mechanism can be put into operation.

Another instrument using a self-balancing procedure is the double-beam infra-red spectrometer one form of which is described in British Patent No. 666,270. Briefly, radiation of a given wavelength determined with a spectrometer passes alternately through sample and comparison paths, and finally falls on a detector, the A.C. output from which is amplified, rectified and finally applied to a servo motor which moves an optical attenuator in or out of the comparison path to maintain equality between the energy in the two radiation paths. If the energy in the two paths is the same, the output from the detector will be constant and have no A.C. component; the motor will therefore come to rest. As soon as one path has more energy than the other, an A.C. signal will appear and the balancing motor will run in the direction necessary to restore balance.

These two examples can be multiplied many times since numerous modern instruments utilise the self-balancing principle.

Frequently, a difficulty arises where the signal is obtained in the form of A.C. at a frequency between, say 5 and 20 c./s., this low frequency being dictated by the response time of the detector, e.g. a condenser detector in an infra-red gas analyser and a thermocouple or bolometer in the case of the infra-red spectrometer.

Servo motors are inefficient at these frequencies and also provision of a reference phase at the same low frequencies is an undesirable complication. It is always possible to rectify and smooth the A.C. signal before feeding it to a conventional self-balancing potentiometer, and use the servo motor of this instrument to balance the beams in the gas analyser or spectrometer but this involves extra complication and the smoothing circuits introduce time lags which give rise to undesirable effects.

An object of the present invention is to overcome these disadvantages.

The invention consists in a method of measuring a physical quantity that can be expressed electrically in which method an A.C. signal representing the physical quantity and at a frequency which is a sub-multiple of the frequency required for indicating or recording means for said signal, is applied to a distorting or shaping circuit and a harmonic at the frequency of the signal required for said indicating or recording means is filtered out and applied to said indicating or recording means.

The invention also consists in a method of measuring a physical quantity that can be expressed electrically in which method an A.C. signal representing the physical quantity and at a frequency which is a sub-multiple of main frequency is applied to a distorting or shaping circuit, a harmonic at mains frequency is filtered out and, after amplification is supplied to one phase of a two-phase electric motor, the other phase, which is a reference phase, being supplied from A.C. mains, the signal and reference voltages being arranged substantially 90° out of phase with one another so that the signal voltage produces rotation of the motor, the movement of the motor being communicated to means for reducing the signal voltage to zero, said means being calibrated to give a measure of the physical quantity.

The invention also consists in a method in accordance with the preceding paragraph for measuring a physical quantity in which method the motor drives the slide wire of an A.C. potentiometer which provides an A.C. voltage at the same frequency as, but in opposition to, the A.C. signal, both potentiometer current and A.C. signal being derived from a common voltage source, said slide wire moving until the A.C. voltage from the potentiometer equals the A.C. signal and being calibrated to give a measure of the physical quantity.

The invention also consists in infra-red analysing apparatus comprising one or two sources of infra-red radiation, both sources being fed from a common voltage supply, which sources direct radiation along two optical paths, one containing a sample under test and the other providing a comparison path, the radiations in both paths being chopped at a submultiple of mains frequency so that detector means, receiving radiation from each path produces an A.C. signal proportion to any difference of energy between the radiations falling on the detecting means from the respective paths and dependent on the absorption of radiation by the sample, said signal, also being a submultiple of the mains frequency, being supplied to a distorting or shaping circuit in which a harmonic at mains frequency is filtered out and, after amplification, is supplied to one phase of a two-phase motor, the reference phase of which is supplied from A.C. mains, the signal and reference voltages being arranged substantially 90° out of phase so that the signal produces rotation of the motor, said motor being coupled to means for balancing the radiant energy in the optical paths so that the A.C. signal produced by the detecting means is reduced to zero, said balancing means being calibrated to provide a measure of the concentration of the component of interest in the sample under test.

The invention will now be described by way of example with reference to the accompanying drawings in which.

Figure 1A:
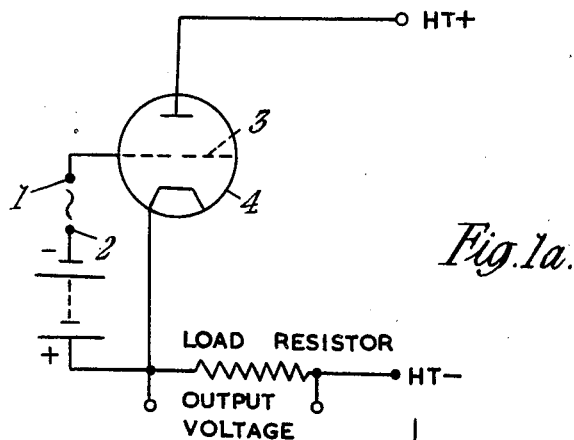
Figure 1a is a diagrammatic view of the distorting means.
Figure 1B:
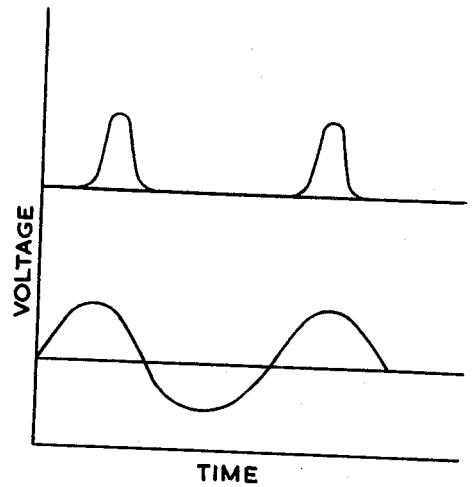
Figure 1b is the waveform of the current passed by the valve.

Distortion of the A.C. signal representing the physical quantity, can be accomplished in various ways, but a preferred method is to apply to voltage at terminals 1, 2 to the grid 3 of a valve 4 as shown in Figure 1a of the drawings, the valve being biassed negatively so that the anode current is small in the absence of a signal. On the positive half of the signal the valve passes current and the waveform is as shown in Figure 1b. The shape can be altered somewhat by variation of the amplifier gain and grid bias. Such a waveform is rich in harmonics and either the second, third, fourth or higher harmonic can be separated by means of a conventional filter circuit. If the signal frequency is 16⅔ c./s. the third harmonic is employed, whereas with a frequency of 12½ c./s. the fourth harmonic is utilised.

If the mains frequency is 25, 40 or 60 c./s. the same procedure can be employed provided the A.C. signal is at a frequency which is a sub-multiple of the mains frequency.

Figure 2:
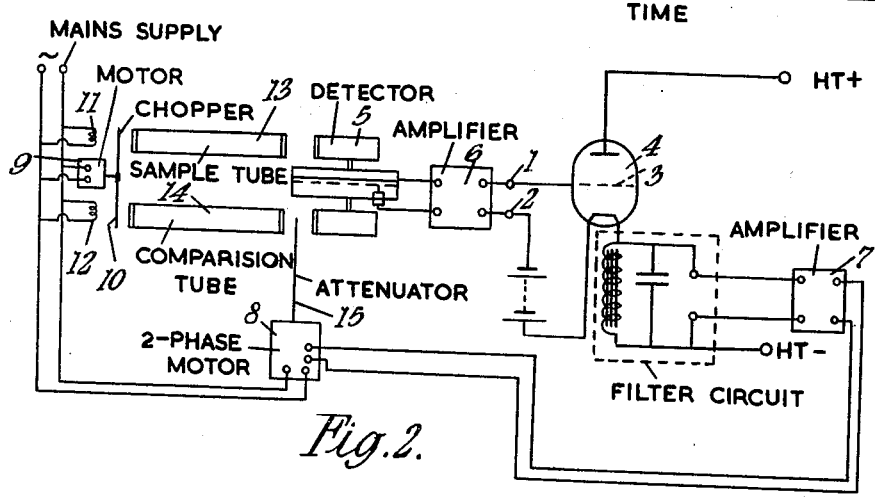
Figure 2 is a diagrammatic view of infra-red analysing apparatus embodying the present invention.

In one example illustrated in Figure 2 of the drawings, an amplifier 7 is fed to one phase of a two-phase motor 8, the other phase of which is fed from the mains supply. The supply for the motor 9 driving the chopper 10 is also taken from the mains as are the sources of radiation 11 and 12. The sample and comparison tubes are shown at 13 and 14 respectively. The two phase motor 8 drives an attenuator 15 in and out of the comparison path.

The invention is applicable to infra-red analysing apparatus such as gas analysers and double-beam spectrometers.

In such apparatus the frequency of the A.C. signal depends on the frequency of interruption or chopping of the radiation in which case the chopping frequency must be a sub-multiple of the mains frequency.

Advantages of the procedure described above are:

(1) Simple circuitry employing conventional A.C. amplification and filter circuits.
(2) Elimination of contacts for rectification or conversion of D.C. into A.C.
(3) Minimum load on motor driving chopper since only the chopping vane is driven.
(4) Absence of smoothing circuits effective at low frequencies, with attendant time lags and possible tendency to instability in the system.

I claim:

1. Infra-red analysing apparatus comprising at least one source of infra-red radiation, means for directing said radiation along two optical paths, one of said paths containing a sample under test and the other providing a comparison path, means for chopping the radiations in both said paths at a sub-multiple of mains frequency, detector means arranged to receive radiation from each of said paths to produce an A.C. signal proportional to any difference of energy between the radiations falling on the detector means from the respective paths and dependent upon the absorption of radiation by said sample, said detector being adapted to produce its A.C. signal at the same frequency as that of beam chopping, a distorting circuit receiving said signal and arranged to select and filter out a harmonic at mains frequency, means for amplifying said harmonic, a two-phase electric motor, means for supplying said selected harmonic to one phase of said motor, means for supplying the other phase of said motor from the A.C. mains to constitute a reference phase which is arranged to be substantially 90° out of phase with the signal voltage in the other phase so that the signal produces rotation of the motor, and means coupled with the motor for balancing the radiant energy in the aforesaid optical paths so that the A.C. signal produced by the detector means is reduced to zero, said balancing means being calibrated to provide a measure of the concentration of a component of interest in the sample under test.

2. Apparatus according to claim 1, comprising two sources of radiation fed from a common voltage supply.

3. Apparatus according to claim 1, in which the balancing means comprises an A.C. potentiometer having a slide wire displaceable by the motor.

References Cited in the file of this patent

UNITED STATES PATENTS 2,741,941     Madsen et al.  ---------- Apr. 17, 1956
2,758,215     Skarstrom  -------------- Aug. 7, 1956